(12) United States Patent
Saglam et al.

(10) Patent No.: US 11,382,119 B2
(45) Date of Patent: Jul. 5, 2022

(54) DOWNLINK SCHEDULING OF TERMINAL DEVICES

(71) Applicant: Telefonaktiebolaget LM Ericsson (publ), Stockholm (SE)

(72) Inventors: Mehmet Izzet Saglam, Istanbul (TR); Irfan Bekleyen, Sollentuna (SE); Mesut Kartal, Üsküdar (TR); Aktul Kavas, Istanbul (TR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 162 days.

(21) Appl. No.: 16/636,126

(22) PCT Filed: Sep. 11, 2017

(86) PCT No.: PCT/EP2017/072687
§ 371 (c)(1),
(2) Date: Feb. 3, 2020

(87) PCT Pub. No.: WO2019/048060
PCT Pub. Date: Mar. 14, 2019

(65) Prior Publication Data
US 2020/0205181 A1    Jun. 25, 2020

(51) Int. Cl.
*H04L 12/28* (2006.01)
*H04W 72/12* (2009.01)

(52) U.S. Cl.
CPC ... *H04W 72/1273* (2013.01); *H04W 72/1231* (2013.01)

(58) Field of Classification Search
CPC ......... H04W 72/1273; H04W 72/1231; H04W 72/1252
USPC .... 370/229, 230, 230.1, 235, 252, 328, 329, 370/330, 332, 395.2, 395.21, 395.4, 468
See application file for complete search history.

(56) References Cited

U.S. PATENT DOCUMENTS

| 9,674,861 | B1 | 6/2017 | Pawar et al. |
| 2013/0148608 | A1* | 6/2013 | Wang ............... H04W 72/085 370/329 |
| 2016/0249354 | A1 | 8/2016 | Crosby |

OTHER PUBLICATIONS

Logarithm—Wikipedia (https://en.wikipedia.org/wiki/Logarithm) (Year: 2021).*
S. Nonchev and M. Valkama, "Efficient Packet Scheduling Schemes for Multiantenna Packet Radio Downlink," 2009 Fifth Advanced International Conference on Telecommunications, 2009, pp. 404-409, doi: 10.1109/AICT.2009.73. (Year: 2009).*

(Continued)

*Primary Examiner* — Nguyen H Ngo
(74) *Attorney, Agent, or Firm* — Murphy, Bilak & Homiller, PLLC

(57) ABSTRACT

There is provided mechanisms for downlink scheduling of terminal devices. A method is performed by a network node. The method comprises obtaining user-specific throughput and user-specific channel conditions per scheduling opportunity for each of the terminal devices to be scheduled. The method comprises scheduling, in each scheduling opportunity, the terminal devices according to an order. The order is determined by individually weighting the user-specific throughput and individually weighting the user-specific channel conditions for each terminal device to be scheduled.

16 Claims, 4 Drawing Sheets

(56) References Cited

OTHER PUBLICATIONS

Asvial, Muhamad, et al., "Modification of Round Robin and Best CQI Scheduling Method for 3GPP LTE Downlink", International Journal of Technology, vol. 6, No. 2, 2015, pp. 130-138.

Bechir, Nsiri, et al., "Novel Scheduling Algorithm for 3GPP Downlink LTE Cellular Network", Procedia Comput. Sci., vol. 40, No. C, 2014, pp. 116-122.

Hoymann, Christian, et al., "A Lean Carrier for LTE", LTE Technology Update: Part 2; IEEE Communications Magazine, Feb. 2013, pp. 74-80.

Kim, Hoon, et al., "An Opportunistic Channel Quality Feedback Scheme for Proportional Fair Scheduling", IEEE Communications Letters, vol. 11, No. 6, Jun. 2007, pp. 501-503.

Mo, Jeonghoon, et al., "Fair End-to-End Window-Based Congestion Control", IEEE/ACM Transactions on Networking, vol. 8, No. 5, Oct. 2000, Oct. 2000, pp. 556-567.

Niu, Jinping, et al., "Scheduling Exploiting Frequency and Multi-User Diversity in LTE Downlink Systems", IEEE Transactions on Wireless Communications; vol. 12, No. 4, Apr. 2013, pp. 1843-1849.

Schwarz, Stefan, et al., "Low Complexity Approximate Maximum Throughput Scheduling for LTE", Conf. Rec.—Asilomar Conf. Signals, Syst. Comput., 2010, pp. 1563-1569.

\* cited by examiner

DOWNLINK SCHEDULING OF TERMINAL DEVICES

TECHNICAL FIELD

Embodiments presented herein relate to a method, a network node, a computer program, and a computer program product for downlink scheduling of terminal devices.

BACKGROUND

In communications networks, there may be a challenge to obtain good performance and capacity for a given communications protocol, its parameters and the physical environment in which the communications network is deployed.

For example, one parameter in providing good performance and capacity for a given communications protocol in a communications network is the scheduling of packets to and from terminal devices served in the communications network.

The general task of the scheduler is to control the allocation of shared time/frequency resources (such as physical resource blocks; PRBs) among the terminal devices at each scheduling opportunity. The scheduler is commonly located in a network node of the network and assigns uplink and downlink resources to the served terminal devices according to a scheduling scheme. For example, the scheduler might determine to which terminal device or terminal devices the shared resources should be allocated in each transmission time interval (TTI).

As an example, in so-called Round Robin (RR) scheduling, also referred to as Resource Fair (RF) scheduling, an equal amount of resources is distributed to each terminal device in turn, irrespective of their prevailing channel conditions. RR scheduling is thus resource fair in the sense that each terminal device has equal use of the resources and the interval between the resources in two adjacent scheduling opportunities is the same for all terminal devices. However, this type of scheduling might be ineffective for terminal devices with unequal channel conditions.

Another type of scheduling is to assign resources to the terminal devices according to the best reported channel conditions. This is generally referred to as maximum channel quality indicator (CQI) scheduling. However, this type of scheduling might result in that those terminal devices having worst channel conditions are assigned inadequate resources.

Hence, there is still a need for improved scheduling.

SUMMARY

An object of embodiments herein is to provide efficient downlink scheduling of terminal devices.

According to a first aspect there is presented a network node for downlink scheduling of terminal devices. The network node comprises processing circuitry. The processing circuitry is configured to cause the network node to obtain user-specific throughput and user-specific channel conditions per scheduling opportunity for each of the terminal devices to be scheduled. The processing circuitry is configured to cause the network node to schedule, in each scheduling opportunity, the terminal devices according to an order. The order is determined by individually weighting the user-specific throughput and individually weighting the user-specific channel conditions for each terminal device to be scheduled.

According to a second aspect there is presented a network node for downlink scheduling of terminal devices. The network node comprises an obtain module configured to obtain user-specific throughput and user-specific channel conditions per scheduling opportunity for each of the terminal devices to be scheduled. The network node comprises a schedule module configured to schedule, in each scheduling opportunity, the terminal devices according to an order. The order is determined by individually weighting the user-specific throughput and individually weighting the user-specific channel conditions for each terminal device to be scheduled.

According to a third aspect there is presented a system for downlink scheduling of terminal devices. The system comprises at least one network node according to any of the first aspects and the second aspect.

According to a fourth aspect there is presented a method for downlink scheduling of terminal devices. The method is performed by a network node. The method comprises obtaining user-specific throughput and user-specific channel conditions per scheduling opportunity for each of the terminal devices to be scheduled. The method comprises scheduling, in each scheduling opportunity, the terminal devices according to an order. The order is determined by individually weighting the user-specific throughput and individually weighting the user-specific channel conditions for each terminal device to be scheduled.

According to a fifth aspect there is presented a computer program for downlink scheduling of terminal devices, the computer program comprising computer program code which, when run on a network node, causes the network node to perform a method according to the fourth aspect.

According to a sixth aspect there is presented a computer program product comprising a computer program according to the fifth aspect and a computer readable storage medium on which the computer program is stored. The computer readable storage medium could be a non-transitory computer readable storage medium.

Advantageously these network nodes, this system, this method, this computer program and this computer program product provide efficient downlink scheduling of terminal devices.

Advantageously these network nodes, this system, this method, this computer program and this computer program product exceed the fairness performance of the maximum CQI scheduler and the throughput performance of the PF scheduler, independently from the number of terminal devices to be scheduled.

Advantageously these network nodes, this system, this method, this computer program and this computer program product deliver a sufficient performance to run a communication application at an acceptable level of quality, even for terminal devices located far from the transmission and reception point (also referred to as so-called cell edge users).

Advantageously these network nodes, this system, this method, this computer program and this computer program product have higher power efficiency than the RR scheduler.

Advantageously these network nodes, this system, this method, this computer program and this computer program product allow for easy implementation and are not computationally intensive to execute.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
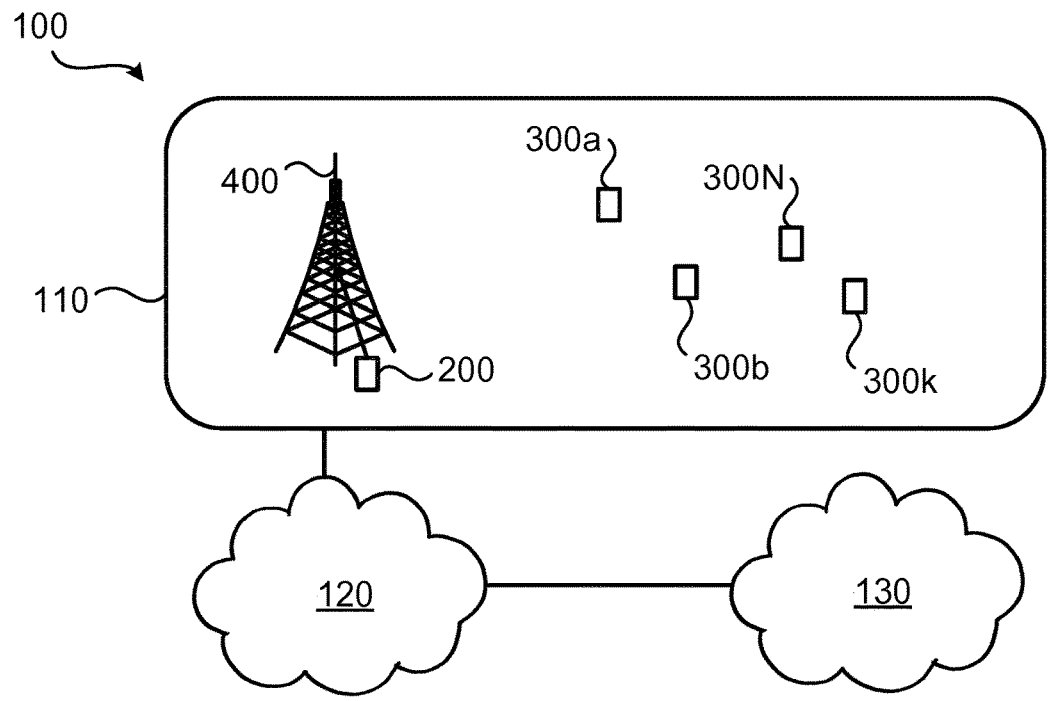
FIG. 1 is a schematic diagram illustrating a communications system according to embodiments.

FIG. 1 is a schematic diagram illustrating a communications system 100 where embodiments presented herein can be applied. The communications network 100 could be a third generation (3G) telecommunications network, a fourth generation (4G) telecommunications network, or a fifth (5G) telecommunications network and support any 3GPP telecommunications standard.

The communications system 100 comprises a network node 200 configured to, in a radio access network 110, provide network access to terminal devices 300a, 300b, . . . , 300k, . . . 300N. The radio access network 110 is operatively connected to a core network 120. The core network 120 is in turn operatively connected to a service network 130, such as the Internet. The terminal devices 300a, 300b, . . . , 300k, . . . 300N are thereby, via the network node 200, enabled to access services of, and exchange data with, the service network 130. Examples of network nodes are radio access network nodes, radio base stations, base transceiver stations, Node Bs, evolved Node Bs, g Node Bs, access points, and access nodes. Examples of terminal devices are wireless devices, mobile stations, mobile phones, handsets, wireless local loop phones, user equipment (UE), smartphones, laptop computers, tablet computers, network equipped sensors, network equipped vehicles, and so-called Internet of Things devices.

In general terms, the network node 200 provide network access in the radio access network 110 by transmitting signals to, and receiving signals from, the terminal devices 300a, 300b, . . . , 300k, . . . 300N. The signals could be transmitted from, and received by, a transmission and reception point (TRP) 400 of the network node 200. The TRP 400 could form an integral part of the radio network node 200 or be physically separated from the network node 200.

The network node 200 transmits signals to, and receives signals from, the terminal devices 300a, 300b, . . . , 300k, . . . 300N according to a scheduling order. However, as disclosed above there is a need for improved scheduling.

The embodiments disclosed herein therefore relate to mechanisms for downlink scheduling of terminal devices 300a, 300b, . . . , 300k, . . . 300N. In order to obtain such mechanisms there is provided a network node 200, a method performed by the network node 200, a computer program product comprising code, for example in the form of a computer program, that when run on a network node 200, causes the network node 200 to perform the method.

Figure 2:
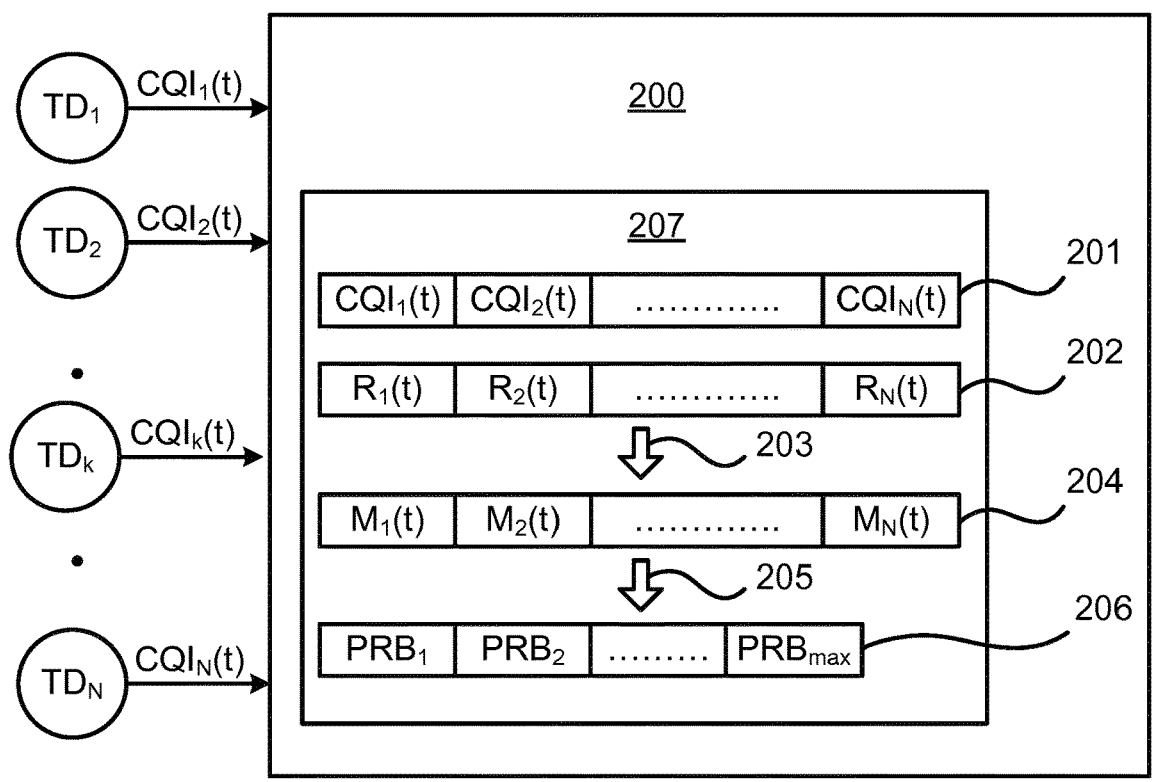
FIG. 2 is a schematic diagram of a scheduler in a network node.

FIG. 2 schematically illustrates a scheduler 207 in a network node 200 according to an embodiment. The scheduler 207 receives an individual channel condition value 201, as represented by a channel quality indicator (CQI), as well as an individual instantaneous throughput value $R_k(t)$ 202 from each terminal device k (in FIG. 2 denoted TDk for short) for each scheduling opportunity occurring at time t. The scheduler 207 applies respective weighting factors to the individual channel condition values 201 and the individual instantaneous throughput values 202. This is schematically symbolized by arrow 203. The scheduler then determines a scalar metric value $M_k(t)$ 204 for each terminal device per scheduling opportunity. This metric is used as ranking operation. Thus, the scheduler 207 then uses the scalar metric values do determine the order in which the physical resource blocks (PRBs) 206 of the terminal devices are to be scheduled in the scheduling opportunity. This is schematically symbolized by arrow 205. $PRB_1$ is thus the first scheduled resource in the scheduling opportunity, followed by $PRB_2$, and so on, until the last scheduled resource $PRB_{max}$. Depending on the amount of terminal devices 300a, 300b, . . . , 300k, . . . 300N to be scheduled, the amount of resources needed by each terminal device 300a, 300b, . . . , 300k, . . . 300N, etc. it could be that one or more of the terminal devices 300a, 300b, . . . , 300k, . . . 300N is allocated two or more PRBs and/or that one or more of the terminal devices 300a, 300b, . . . , 300k, . . . 300N is not allocated any PRB in the scheduling opportunity. Further, there might be more PRBs than terminal devices, or vice versa.

Figure 3:
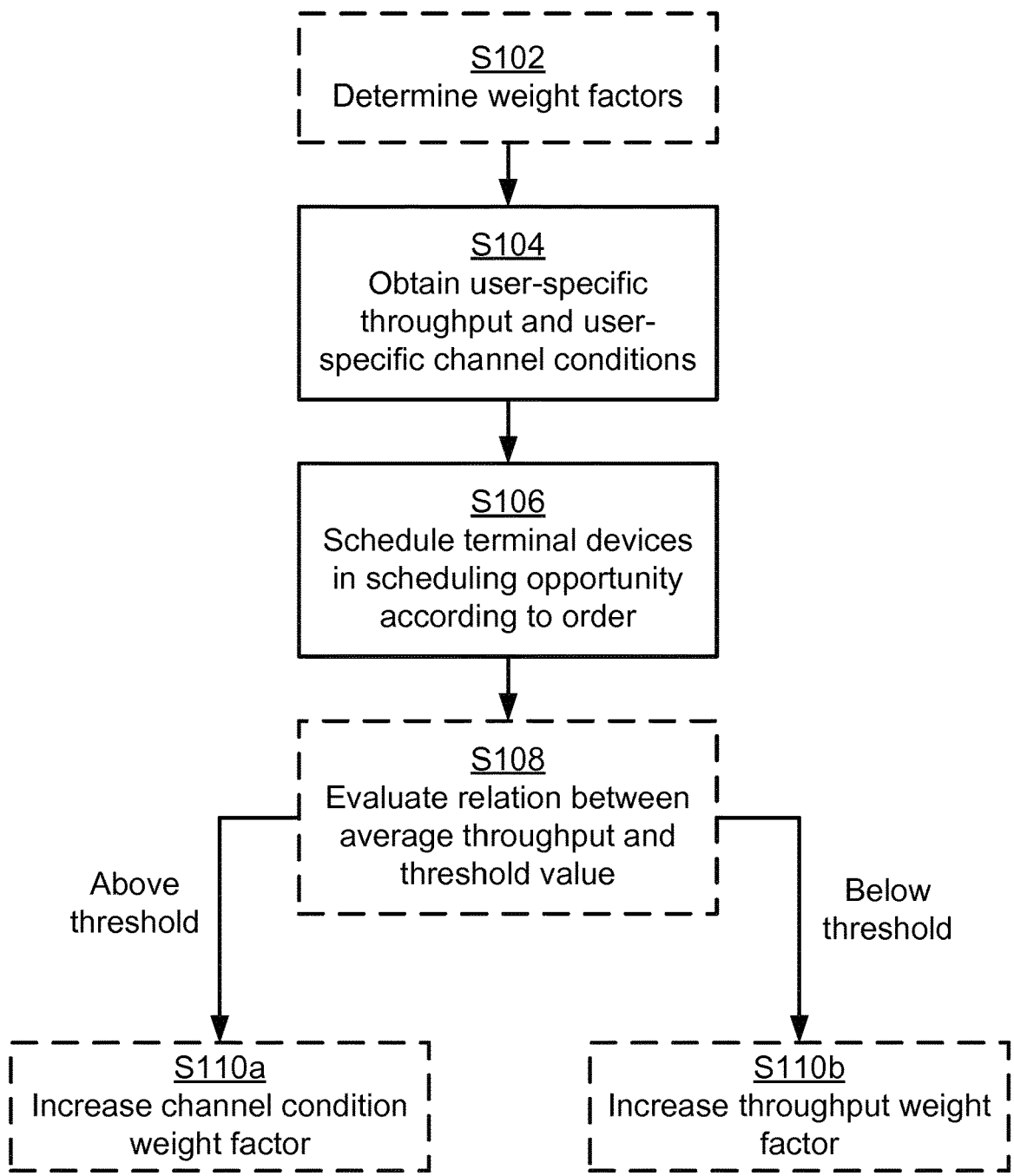
FIGS. 3 and 4 are flowcharts of methods according to embodiments.
Figure 4:
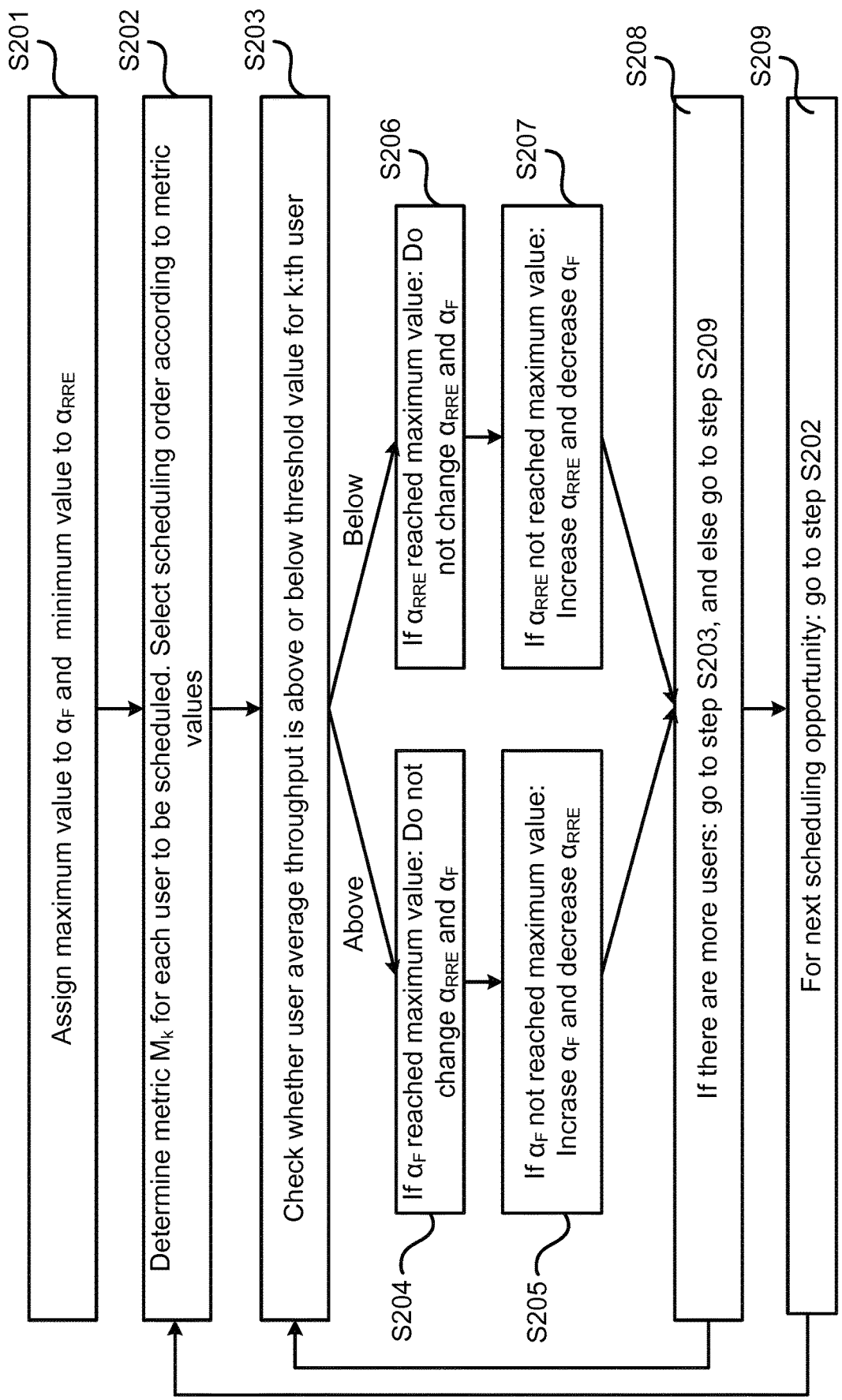

Further, and more detailed, operation of the network node 200 for scheduling the terminal devices 300a, 300b, . . . , 300k, . . . 300N will be disclosed with reference to FIGS. 3 and 4. FIGS. 3 and 4 are flowcharts illustrating embodiments of methods for downlink scheduling of terminal devices 300a, 300b, . . . , 300k, . . . 300N. The methods are performed by the network node 200. The methods are advantageously provided as computer programs 720.

The methods are based on scheduling users (as represented by the terminal devices 300a, 300b, . . . , 300k, . . . 300N) in an order determined by their adaptively weighted user-specific throughput and channel conditions. The scheduling thereby integrates so-called maximum CQI scheduling and PF scheduling. In turn, the disclosed scheduling enables prioritization between scheduling as many low data rate users as possible (by given prioritization to throughput) and scheduling high quality users (by given prioritization to CQI).

In order to perform such scheduling the network node 200 needs information about throughput and channel conditions. The network node 200 is thus configured to perform step S104:

S104: The network node 200 obtains user-specific throughput and user-specific channel conditions per scheduling opportunity for each of the terminal devices 300a, 300b, . . . , 300k, . . . 300N to be scheduled.

This enables the network node 200 to perform the aforementioned scheduling. Particularly, the network node 200 is configured to perform step S106:

S106: The network node 200 schedules, in each scheduling opportunity, the terminal devices 300a, 300b, . . . , 300k, . . . 300N according to an order. The order is determined by individually weighting the user-specific throughput and individually weighting the user-specific channel conditions for each terminal device 300a, 300b, . . . , 300k, . . . 300N to be scheduled.

The scheduling as defined in step S106 effectively obtains a balance between flow efficiency and resource efficiency.

Embodiments relating to further details of downlink scheduling of terminal devices 300a, 300b, . . . , 300k, . . . 300N as performed by the network node 200 will now be disclosed.

There may be different ways to individually weighting the user-specific throughput and individually weighting the user-specific channel conditions for each terminal device 300a, 300b, . . . , 300k, . . . 300N to be scheduled.

In some aspects the network node 200 explicitly determines weight factors that are used when weighting the user-specific throughput and weighting the user-specific channel conditions. Particularly, according to an embodiment the network node 200 is configured to perform (optional) step S102:

S102: The network node 200 determines, per scheduling opportunity, a throughput weight factor, denoted $\alpha_{RRE}$, and a channel condition weight factor, denoted $\alpha_F$, for each terminal device 300a, 300b, . . . , 300k, . . . 300N. The user-specific throughput is weighted with the throughput weight factor $\alpha_{RRE}$ and the user-specific channel conditions are weighted with the channel condition weight factor $\alpha_F$.

A scalar metric, denoted $M_k(t)$, for terminal device k (where k=1, 2, . . . , N and N is the total number of terminal devices to be scheduled) to be used at a scheduling opportunity occurring at time t might then be determined. That is, according to an embodiment a scalar metric $M_k(t)$ is determined for each terminal device 300a, 300b, . . . , 300k, . . . 300N per scheduling opportunity in order to determine the order. During the scheduling the terminal devices might then be selected from highest metric to lowest metric (i.e. starting with the terminal device having highest value of $M_k(t)$ and ending with the terminal device having lowest value of $M_k(t)$). When a separate value of the scalar metric $M_k(t)$ has been determined for each terminal device, the values are thus then used as part of a ranking operator in the scheduler.

There could be different parameters on which the scalar metric $M_k(t)$ depends.

In some aspects the scalar metric $M_k(t)$ depends on the moving average throughput of terminal device k, representing the average data rate of the terminal devices after scheduling. Particularly, according to an embodiment the scalar metric $M_k(t)$ is a function of moving average throughput, denoted $T_k(t)$, determined for each terminal device 300a, 300b, . . . , 300k, . . . 300N to be scheduled.

In some aspects the scalar metric $M_k(t)$ depends on the instantaneous throughput of terminal device k, representing the scheduled data rate. Particularly, according to an embodiment the scalar metric $M_k(t)$ is a function of instantaneous throughput, denoted $R_k(t)$, determined for each terminal device 300a, 300b, . . . , 300k, . . . 300N to be scheduled.

In some aspects the scalar metric $M_k(t)$ depends on the instantaneous reported and adjusted channel quality of terminal device k, representing the requested data rate before scheduling. Particularly, according to an embodiment the scalar metric $M_k(t)$ is a function of instantaneous channel quality, denoted $CQI_k(t)$, determined for each terminal device 300a, 300b, . . . , 300k, . . . 300N to be scheduled.

In some aspects the scalar metric $M_k(t)$ depends on the maximum used, or allowed, CQI value in the system. Particularly, according to an embodiment the scalar metric $M_k(t)$ is a function of maximum system-wise channel quality, denoted $CQI_{max}$.

In some aspects the scalar metric $M_k(t)$ depends on the throughput weight factor $\alpha_{RRE}$ for radio resource efficiency. Particularly, according to an embodiment the moving average throughput $T_k(t)$ and the instantaneous throughput $R_k(t)$ are weighted with the throughput weight factor $\alpha_{RRE}$.

In some aspects the scalar metric $M_k(t)$ depends on the channel condition weight factor $\alpha_F$ for fairness. Particularly, according to an embodiment the instantaneous channel quality $CQI_k(t)$ and the maximum system-wise channel quality $CQI_{max}$ are weighted with the channel condition weight factor $\alpha_F$.

There could be different ways to determine the throughput weight factor $\alpha_{RRE}$ and the channel condition weight factor $\alpha_F$. According to an embodiment the throughput weight factor $\alpha_{RRE}$ and the channel condition weight factor $\alpha_F$ are mutually dependent on each other. That is, once the value of $\alpha_F$ has been set, then the value of $\alpha_{RRE}$ follows directly, and vice versa. Particularly, according to an embodiment the throughput weight factor $\alpha_{RRE}$ and the channel condition weight factor $\alpha_F$ are determined such that:

$$\alpha_{RRE} + s \cdot \alpha_F = 1,$$

where s is a scale factor. The scale factor s has a configurable value and thus defines the ratio between $\alpha_{RRE}$ and $\alpha_F$. Thus, in some aspects both $\alpha_{RRE}$ and $\alpha_F$ take values in the interval [0, 1].

The network node 200 might be configured to increases $\alpha_F$ (for increased flow efficiency) slowly and decrease it sharply to respond faster to the minimum throughput threshold.

Collectively, based on parameters as defined above, the scalar metric $M_k(t)$ for terminal device k at time t is, according to an embodiment, given by:

$$M_k(t) = \alpha_{RRE} \cdot \log\left(\frac{R_k(t)}{T_k(t)}\right) - \alpha_F \cdot \log\left(\frac{CQI_k(t)}{CQI_{max}}\right),$$

where log(x) denotes the logarithm of x. The scalar metric $M_k(t)$ could then be optimized to guarantee a sufficient performance to run a communication application at an acceptable cell edge quality. One way to optimize the scalar metric $M_k(t)$ is to adjust the values of $\alpha_{RRE}$ and $\alpha_F$. Therefore, in some aspects the values of $\alpha_{RRE}$ and $\alpha_F$ are considered for updating per scheduling opportunity. One factor to determined whether to update the values of $\alpha_{RRE}$ and $\alpha_F$ is to compare the average throughput to a threshold throughput value. Particularly, according to an embodiment the network node 200 is configured to perform (optional) step S108:

S108: The network node 200 evaluates how an average throughput of the scheduling opportunity relates to a threshold throughput value.

For example, the network node 200 might in step S108 check whether the average throughput is above or below a threshold throughput value. There could be different threshold throughput values, for example, depending on user requirements or network requirements. A typical threshold throughput value is in the order of 1 Mbps. Another typical threshold throughput value is in the order of 10 Mbps.

Depending on the outcome of step S108 the network node 200 might then, per scheduling opportunity, update the values of $\alpha_{RRE}$ and $\alpha_F$.

The channel condition weight factor $\alpha_F$ might be increased if the average throughput is above the threshold throughput value. That is, according to an embodiment the network node 200 is configured to perform (optional) step S110a when the average throughput is above the threshold throughput value:

S110a: The network node 200 increases the channel condition weight factor $\alpha_F$ for a next scheduling opportunity.

Since, according to an embodiment, the throughput weight factor $\alpha_{RRE}$ and the channel condition weight factor $\alpha_F$ are mutually dependent on each other, increasing the channel condition weight factor $\alpha_F$ causes the throughput weight factor $\alpha_{RRE}$ to be decreased. However, it could be that the channel condition weight factor $\alpha_F$ has already reached it upper limit (or conversely that the throughput weight factor $\alpha_{RRE}$ has already reached it lower limit) and in this case a further increase of the channel condition weight factor $\alpha_F$ might not be possible.

The throughput weight factor $\alpha_{RRE}$ might be increased if the average throughput is below the threshold throughput value. That is, according to an embodiment the network node 200 is configured to perform (optional) step S110b when the average throughput is below the threshold throughput value:

S110b: The network node 200 increases the throughput weight factor $\alpha_{RRE}$ for a next scheduling opportunity.

Again, since, according to an embodiment, the throughput weight factor $\alpha_{RRE}$ and the channel condition weight factor $\alpha_F$ are mutually dependent on each other, increasing the throughput weight factor $\alpha_{RRE}$ causes the channel condition weight factor $\alpha_F$ to be decreased. However, it could be that the throughput weight factor $\alpha_{RRE}$ has already reached it upper limit (or conversely that the channel condition weight factor $\alpha_F$ has already reached it lower limit) and in this case a further increase of the throughput weight factor $\alpha_{RRE}$ might not be possible.

No change of the channel condition weight factor $\alpha_F$ or the throughput weight factor $\alpha_{RRE}$ is needed if the average throughput of the scheduling opportunity equals, or is within a minimum distance from, the threshold throughput value. The minimum distance could be in the order of 5% or 10% of the threshold throughput value.

One particular embodiment for downlink scheduling of terminal devices 300a, 300b, ..., 300k, ... 300N as performed by the network node 200 based on the above disclosed embodiments, aspects, and examples will now be disclosed with reference to FIG. 4.

S201: The channel condition weight factor $\alpha_F$ is assigned its maximum value (typically $\alpha_F=1$) and the throughput weight factor $\alpha_{RRE}$ is assigned its minimum value (typically $\alpha_{RRE}=0$).

S202: A value of the scalar metric $M_k(t)$ is determined for each terminal device k at time t to be scheduled in the current scheduling opportunity. The network node schedules the terminal devices in an order from highest to lowest scalar metric value by performing step S203 and any of steps S204-S207 for each terminal device.

S203: The network node 200 in the next scheduling opportunity checks whether the user average throughput is above or below the threshold throughput value. Step S204 is entered if the user average throughput is above the threshold throughput value and step S206 is entered if the user average throughput is below the threshold throughput value.

S204: If the channel condition weight factor $\alpha_F$ has reached its maximum value, neither the channel condition weight factor $\alpha_F$ nor the throughput weight factor $\alpha_{RRE}$ are updated.

S205: If the channel condition weight factor $\alpha_F$ has not reached its maximum value, the channel condition weight factor $\alpha_F$ is increased with an up-step value and the throughput weight factor $\alpha_{RRE}$ is decreased with a down-step value.

S206: If the throughput weight factor $\alpha_{RRE}$ has reached its maximum value, neither the channel condition weight factor $\alpha_F$ nor the throughput weight factor $\alpha_{RRE}$ are updated.

S207: If the throughput weight factor $\alpha_{RRE}$ has not reached its maximum value, the throughput weight factor $\alpha_{RRE}$ is increased with an up-step value and the channel condition weight factor $\alpha_F$ is decreased with a down-step value.

S208: Step S203 is entered again for the next ordered terminal device until all terminal devices have been scheduled in the scheduling opportunity. Step S209 is then entered.

S209: Step S202 is entered again for the next scheduling opportunity, and execution halts if there are no more scheduling opportunities.

Figure 5:
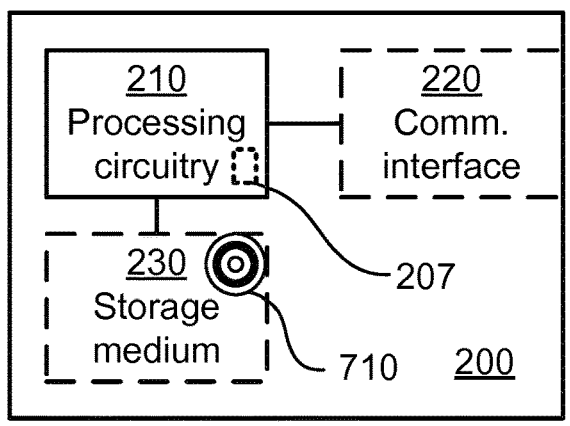
FIG. 5 is a schematic diagram showing functional units of a network node according to an embodiment.

FIG. 5 schematically illustrates, in terms of a number of functional units, the components of a network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 710 (as in FIG. 7), e.g. in the form of a storage medium 230. The processing circuitry 210 may further be provided as at least one application specific integrated circuit (ASIC), or field programmable gate array (FPGA). In some aspects the processing circuitry 210 implements the functionality of the scheduler 207.

Particularly, the processing circuitry 210 is configured to cause the network node 200 to perform a set of operations, or steps, S102-S110b, S201-S209, as disclosed above. For example, the storage medium 230 may store the set of operations, and the processing circuitry 210 may be configured to retrieve the set of operations from the storage medium 230 to cause the network node 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The network node 200 may further comprise a communications interface 220 at least configured for communications with other entities, devices, nodes, terminals, and functions of the communications system 100. As such the communications interface 220 may comprise one or more transmitters and receivers, comprising analogue and digital components. The processing circuitry 210 controls the general operation of the network node 200 e.g. by sending data and control signals to the communications interface 220 and the storage medium 230, by receiving data and reports from the communications interface 220, and by retrieving data and instructions from the storage medium 230. Other components, as well as the related functionality, of the network node 200 are omitted in order not to obscure the concepts presented herein.

Figure 6:
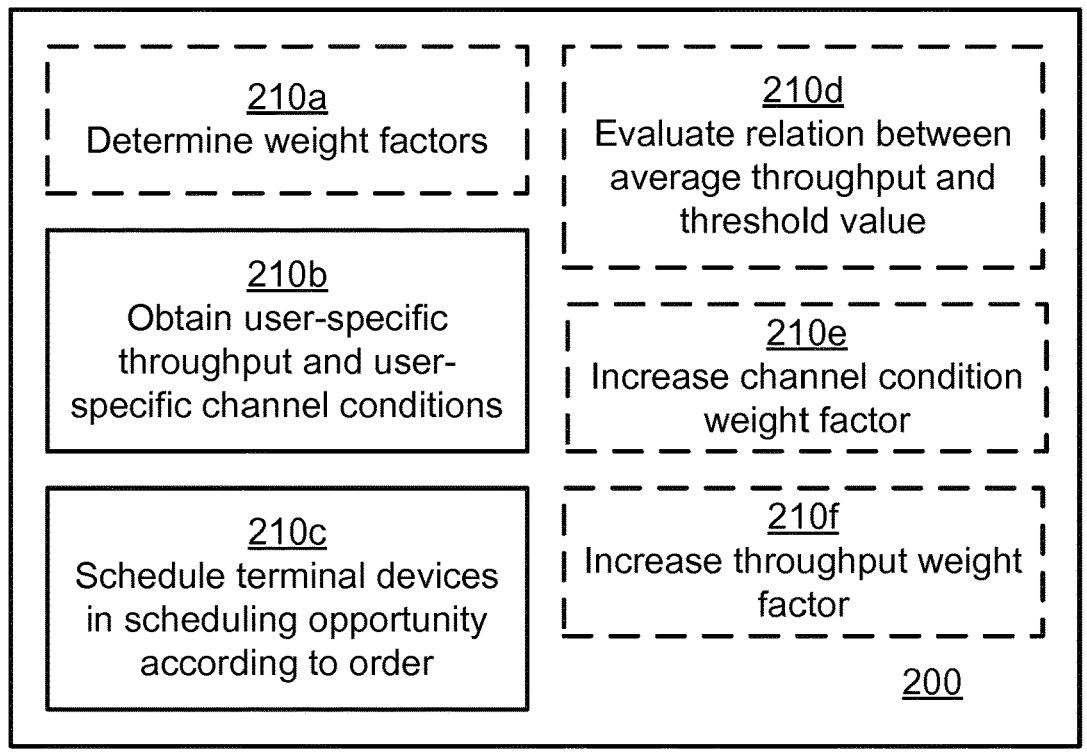
FIG. 6 is a schematic diagram showing functional modules of a network node according to an embodiment.

FIG. 6 schematically illustrates, in terms of a number of functional modules, the components of a network node 200 according to an embodiment. The network node 200 of FIG. 6 comprises a number of functional modules; an obtain module 210b configured to perform step S104, and a schedule module 210c configured to perform step S106. The network node 200 of FIG. 6 may further comprise a number of optional functional modules, such as any of a determine module 210a configured to perform step S102, an evaluate module 210d configured to perform step S108, a first increase module 210e configured to perform step S110a, and a second increase module 210f configured to perform step S110b. In general terms, each functional module 210a-210f may in one embodiment be implemented only in hardware and in another embodiment with the help of software, i.e., the latter embodiment having computer program instructions stored on the storage medium 230 which when run on the processing circuitry makes the network node 200 perform the corresponding steps mentioned above in conjunction with FIG. 6. It should also be mentioned that even though the modules correspond to parts of a computer program, they do not need to be separate modules therein, but the way in which they are implemented in software is dependent on the programming language used. Preferably, one or more or all functional modules 210a-210f may be implemented by the processing circuitry 210, possibly in cooperation with the communications interface 220 and/or the storage medium 230. The processing circuitry 210 may thus be configured to from the storage medium 230 fetch instructions as provided by a functional module 210a-210f and to execute these instructions, thereby performing any steps as disclosed herein.

The network node 200 may be provided as a standalone device or as a part of at least one further device. For example, the network node 200 may be provided in a node of the radio access network 110 or in a node of the core network. 120 Alternatively, functionality of the network node 200 may be distributed between at least two devices, or nodes. These at least two nodes, or devices, may either be part of the same network part (such as the radio access network 110 or the core network 120) or may be spread between at least two such network parts. In general terms, instructions that are required to be performed in real time may be performed in a device, or node, operatively closer to the terminal devices 300a-300N than instructions that are not required to be performed in real time.

Thus, a first portion of the instructions performed by the network node 200 may be executed in a first device, and a second portion of the of the instructions performed by the network node 200 may be executed in a second device; the herein disclosed embodiments are not limited to any particular number of devices on which the instructions performed by the network node 200 may be executed. Hence, the methods according to the herein disclosed embodiments are suitable to be performed by a network node 200 residing in a cloud computational environment. Therefore, although a single processing circuitry 210 is illustrated in FIG. 5 the processing circuitry 210 may be distributed among a plurality of devices, or nodes. The same applies to the functional modules 210a-210f of FIG. 6 and the computer program 720 of FIG. 7 (see below).

Figure 7:
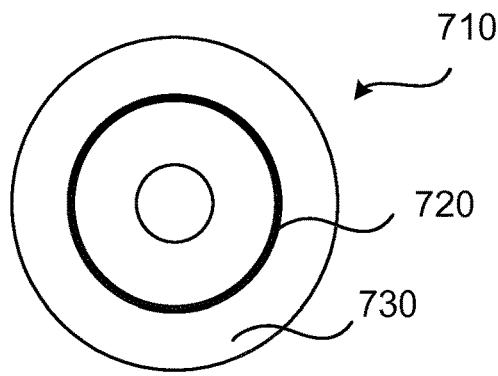
FIG. 7 shows one example of a computer program product comprising computer readable storage medium according to an embodiment.

FIG. 7 shows one example of a computer program product 710 comprising computer readable storage medium 730. On this computer readable storage medium 730, a computer program 720 can be stored, which computer program 720 can cause the processing circuitry 210 and thereto operatively coupled entities and devices, such as the communications interface 220 and the storage medium 230, to execute methods according to embodiments described herein. The computer program 720 and/or computer program product 710 may thus provide means for performing any steps as herein disclosed.

In the example of FIG. 7, the computer program product 710 is illustrated as an optical disc, such as a CD (compact disc) or a DVD (digital versatile disc) or a Blu-Ray disc. The computer program product 710 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 720 is here schematically shown as a track on the depicted optical disk, the computer program 720 can be stored in any way which is suitable for the computer program product 710.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A network node configured for downlink scheduling of terminal devices, the network node comprising:
  processing circuitry configured to cause the network node to:
    for each of the terminal devices to be scheduled, obtain user-specific throughput and user-specific channel conditions per scheduling opportunity;
    determine, in each scheduling opportunity, a throughput weight factor $\alpha_{RRE}$ and a channel condition weight factor $\alpha_F$ for each terminal device;
    schedule, in each scheduling opportunity, the terminal devices according to an order determined by weighting the user-specific throughput with the throughput weight factor $\alpha_{RRE}$ and weighting the user-specific channel conditions with the channel condition weight factor $\alpha_F$;
    for each scheduling opportunity, evaluate how an average throughput of the scheduling opportunity relates to a threshold throughput value;
    when the average throughput is above the threshold throughput value, increase the channel condition weight factor $\alpha_F$ for a next scheduling opportunity; and
    when the average throughput is below the threshold throughput value, increase the throughput weight factor $\alpha_{RRE}$ for the next scheduling opportunity.

2. The network node of claim 1, the processing circuitry is further configured to cause the network node to:
  for each scheduling opportunity occurring at a time t, determine a scalar metric $M_k(t)$ for each terminal device k, wherein the order is determined, in each scheduling opportunity, based on the scalar metrics determined for the respective terminal devices in the particular scheduling opportunity.

3. The network node of claim 2, wherein the scalar metric $M_k(t)$ is determined according to a function of one or more of the following:
- moving average throughput $T_k(t)$ determined for each terminal device to be scheduled;
- instantaneous throughput $R_k(t)$ determined for each terminal device to be scheduled;
- instantaneous channel quality $CQI_k(t)$ determined for each terminal device to be scheduled; and
- a maximum allowed channel quality $CQI_{max}$.

4. The network node of claim 3, wherein:
- the moving average throughput $T_k(t)$ and the instantaneous throughput $R_k(t)$ are weighted with the throughput weight factor $\alpha_{RRE}$; and
- the instantaneous channel quality $CQI_k(t)$ and the maximum system wise allowed channel quality $CQI_{max}$ are weighted with the channel condition weight factor $\alpha_F$.

5. The network node of claim 3, wherein the scalar metric $M_k(t)$ for terminal device k at time t is determined according to:

$$M_k(t) = \alpha_{RRE} \cdot \log\left(\frac{R_k(t)}{T_k(t)}\right) - \alpha_F \cdot \log\left(\frac{CQI_k(t)}{CQI_{max}}\right).$$

6. The network node of claim 1, wherein the throughput weight factor $\alpha_{RRE}$ and the channel condition weight factor $\alpha_F$ are mutually dependent on each other.

7. The network node of claim 1, wherein the throughput weight factor $\alpha_{RRE}$ and the channel condition weight factor $\alpha_F$ are determined such that:

$\alpha_{RRE} + s \cdot \alpha_F = 1$, where s is a scale factor.

8. A system for downlink scheduling of terminal devices, the system comprising:
- at least one network node according to claim 1; and
- at least one of the terminal devices to be scheduled.

9. A method for downlink scheduling of terminal devices, the method being performed by a network node, the method comprising:
- for each of the terminal devices to be scheduled, obtaining user-specific throughput and user-specific channel conditions per scheduling opportunity;
- determining, in each scheduling opportunity, a throughput weight factor $\alpha_{RRE}$ and a channel condition weight factor $\alpha_F$ for each terminal device;
- scheduling, in each scheduling opportunity, the terminal devices according to an order determined by weighting the user-specific throughput with the throughput weight factor $\alpha_{RRE}$ and weighting the user-specific channel conditions with the channel condition weight factor $\alpha_F$;
- for each scheduling opportunity, evaluating how an average throughput of the scheduling opportunity relates to a threshold throughput value;
- when the average throughput is above the threshold throughput value, increasing the channel condition weight factor $\alpha_F$ for a next scheduling opportunity; and
- when the average throughput is below the threshold throughput value, increasing the throughput weight factor $\alpha_{RRE}$ for the next scheduling opportunity.

10. The method of claim 9, further comprising:
- for each scheduling opportunity occurring at a time t, determining a scalar metric $M_k(t)$ for each terminal device k,
- wherein the order is determined, in each scheduling opportunity, based on the scalar metrics determined for the respective terminal devices in the particular scheduling opportunity.

11. The method of claim 10, wherein the scalar metric $M_k(t)$ is a function of one or more of the following:
- moving average throughput $T_k(t)$ determined for each terminal device to be scheduled;
- instantaneous throughput $R_k(t)$ determined for each terminal device to be scheduled;
- instantaneous channel quality $CQI_k(t)$ determined for each terminal device to be scheduled; and
- a maximum allowed channel quality $CQI_{max}$.

12. The method of claim 11, wherein:
- the moving average throughput $T_k(t)$ and the instantaneous throughput $R_k(t)$ are weighted with the throughput weight factor $\alpha_{RRE}$; and
- the instantaneous channel quality $CQI_k(t)$ and the maximum allowed channel quality $CQI_{max}$ are weighted with the channel condition weight factor $\alpha_F$.

13. The method of claim 11, wherein the scalar metric $M_k(t)$ for terminal device k at time t is determined according to:

$$M_k(t) = \alpha_{RRE} \cdot \log\left(\frac{R_k(t)}{T_k(t)}\right) - \alpha_F \cdot \log\left(\frac{CQI_k(t)}{CQI_{max}}\right).$$

14. The method of claim 9, wherein the throughput weight factor $\alpha_{RRE}$ and the channel condition weight factor $\alpha_F$ are mutually dependent on each other.

15. The method of claim 9, wherein the throughput weight factor $\alpha_{RRE}$ and the channel condition weight factor $\alpha_F$ are determined such that:

$\alpha_{RRE} + s \cdot \alpha_F = 1$, where s is a scale factor.

16. A non-transitory, computer-readable medium storing computer-executable instructions that, when executed by processing circuitry of a network node configured for downlink scheduling of terminal devices, causes the network node to perform operations corresponding to the method of claim 9.

* * * * *